United States Patent
Lecart

(10) Patent No.: US 6,928,747 B2
(45) Date of Patent: Aug. 16, 2005

(54) METHOD FOR DECORATING OBJECTS AND DEVICE THEREFOR

(75) Inventor: Fabien Lecart, Mareuil le Port (FR)

(73) Assignee: Sarl LB de la Rosiere, Mareuil le Port (FR)

(*) Notice: Subject to any disclaimer, the term of this patent is extended or adjusted under 35 U.S.C. 154(b) by 0 days.

(21) Appl. No.: 10/496,044

(22) PCT Filed: Nov. 27, 2002

(86) PCT No.: PCT/FR02/04063

§ 371 (c)(1), (2), (4) Date: May 19, 2004

(87) PCT Pub. No.: WO03/045580

PCT Pub. Date: Jun. 5, 2003

(65) Prior Publication Data

US 2005/0016011 A1 Jan. 27, 2005

(30) Foreign Application Priority Data

Nov. 27, 2001 (FR) .............................. 01 15306

(51) Int. Cl.⁷ .................................................. F26B 7/00
(52) U.S. Cl. ................................ 34/421; 34/440; 34/61
(58) Field of Search ........................ 34/389, 413, 416, 34/418, 421, 440, 61; 427/314, 389.7; 118/426

(56) References Cited

U.S. PATENT DOCUMENTS

| | | | |
|---|---|---|---|
| 2,981,639 A | | 4/1961 | Kachele |
| 3,643,626 A | * | 2/1972 | MacKay et al. ............... 118/58 |
| 5,800,647 A | * | 9/1998 | Andersen et al. ............. 156/69 |
| 5,879,496 A | * | 3/1999 | Bright et al. .................. 156/86 |
| 6,214,424 B1 | | 4/2001 | Chubb et al. |
| 6,490,093 B2 | * | 12/2002 | Guest .......................... 359/619 |
| 6,805,908 B2 | * | 10/2004 | Belanger et al. ............ 427/258 |

FOREIGN PATENT DOCUMENTS

| | | |
|---|---|---|
| EP | 0 381 286 A | 8/1990 |
| FR | 1 237 675 A | 7/1960 |
| GB | 0 936 147 A | 9/1963 |
| JP | 60061078 A | 8/1985 |

* cited by examiner

Primary Examiner—Stephen Gravini
(74) Attorney, Agent, or Firm—Egbert Law Offices

(57) ABSTRACT

A method and a device for decorating objects made of a material such as glass or metal, which includes coating at least part of the surface of the objects with a substance adapted to form patterns during polymerization. The method also includes drying and dusting the objects by blowing; conditioning the objects so as to place them in specific physical conditions, for a certain time interval; applying, on the surface of each of the objects, the polymerizable substance; and placing the objects in an environment suitable for their polymerization by drying while forming the desired patterns.

14 Claims, 2 Drawing Sheets

METHOD FOR DECORATING OBJECTS AND DEVICE THEREFOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention regards a method for decorating objects made of a material such as glass or metal, such as bottles, in which at least a portion of the surface of said objects is covered with a coating containing a substance capable of polymerizing while forming patterns.

The present invention relates, furthermore, to a device for implementing said method according to the invention.

BACKGROUND OF THE INVENTION

At present, there are multiple ways of decorating objects, the patterns and effects achieved depending mainly on the techniques and materials used for their carrying out.

There exist of course methods which consist in applying a layer of paint, in which the patterns are not embossed, as the one disclosed in EP 0,381,286 and JP 60061078.

There are also known methods making use of a plastic material which requires a high energy-consuming, high-temperature treatment; such methods are disclosed in GB 936,147 and U.S. Pat. No. 2,981,639.

Other methods are disclosed in prior-art documents, as for example U.S. Pat. No. 6,214,424, which relates to a method used for achieving embossed decorations imitating glass crystals on objects made of glass or plastic.

Said method uses screen-printing and consists, in brief, in printing from a screen a polymer coating on said objects, then treating said polymer, thermally or by UV radiation, so as to obtain the desired glass crystals.

The last step that can be contemplated consists in applying on the obtained pattern a protection coating such as silicone, in particular.

GB 1487 969 discloses a method similar to the preceding one, but based on the use of thermoplastic inks.

It is also known, in particular from EP 0 533 094, to coat objects made of glass by first proceeding to the application of a coating obtained through radical polymerization, then hardening said coating by subjecting it to very high energy radiation.

The various methods described above are generally related to objects made of glass already cooled and released from the mold.

It is however also known to decorate said objects right from the end of their manufacture, while they are still warm and still in their mold.

A method which can be contemplated in this case is described in particular in U.S. Pat. No. 1,693,735.

In this document, it is proposed to apply mineral pigments forming a decoration deposited on a fabric support during the annealing of glass objects that are still warm.

The pigments melt and are fixed on said objects during said annealing.

BRIEF SUMMARY OF THE INVENTION

The present invention relates to another method allowing to achieve patterns imitating glass crystals on objects, such as bottles in particular.

To this end, the object of the invention is a method for decorating objects, such as bottles in particular, in which at least part of the surface of said objects is covered with a coating containing a substance capable of polymerizing while forming patterns, characterized in that:

said objects are dried and dusted by blowing;

said objects are conditioned so as to place them in determined physical conditions for a certain period of time;

on the surface of each of said objects is applied said substance capable of polymerizing; and said objects are placed in an environment allowing said substance to polymerize by drying while forming the desired patterns.

It should be noted that the objects are, preferably, previously washed with water.

According to a first feature of said method, an obscuring of the surface of said objects by sand blasting under a pressure between 2 $kg/cm^2$ and 4 $kg/cm^2$ is previously carried out.

According to another feature of said method, the objects are conditioned for 24 h at a temperature between 4° C. and 6° C., prior to applying said substance capable of polymerizing.

According to another additional feature, on each of the objects is applied a cyclohexanone solution with predetermined viscosity according to the desired final aspect of said patterns.

Furthermore, said method is also characterized in that, after having applied said substance capable of polymerizing on the surface of the objects, the latter are placed for drying for 10 to 60 minutes in an environment of dry air and controlled aeration, under atmospheric pressure and at a temperature between 0° C. and 8° C.

According to another additional feature of a preferred implementation, said method is characterized in that said objects are placed for drying at a temperature between 4° C. and 6° C.

According to another additional feature of the method according to the invention, after having applied said substance capable of polymerizing, said objects are placed for drying in such a way as to avoid any interference between them, while maintaining a certain space between each of them, preferably of about at least 5 cm.

The present invention relates, in addition, to a device for implementing the method as characterized above.

To this end, the object of the invention is a device characterized in that it comprises a movable vat for applying said substance capable of polymerizing on said objects to be decorated, means for seizing and conveying said objects, row by row, to said vat, and means allowing drying said objects under given conditions of temperature, hygrometry and aeration.

In a particularly advantageous way, said device is characterized in that said vat is actuated by a strut piston which causes it to move upwards for coating each row of objects, then to move downwards again.

Furthermore, according to another feature, said seizing and conveying means consist of at least one conveyor belt provided with rows of clamps which can open and close, said conveyor belt being driven by two parallel chains, each actuated by a set of notched wheels.

According to another additional feature of the device according to the invention, the clamps are positioned with respect to each other on each one of the rows at such a distance that the objects, once attached, are spaced about 5 cm from each other.

According to another additional feature, said device includes a supporting frame closed by stiles provided with openings for a controlled passing through of air and the conditioning of said objects for drying.

According to another feature, said device includes, in addition, a tipping carriage conveying said objects, row by row, to said seizing and conveying means.

Finally, according to a last feature, said tipping carriage includes a belt-and-pulley system which facilitates the exit of said rows of objects.

The invention will be better understood when reading the following description, which relates to exemplary embodiments given as an indication and in a non-restrictive way.

The understanding of this description will be made easier with reference attached drawings.

DETAILED DESCRIPTION OF THE INVENTION

Figure 1:
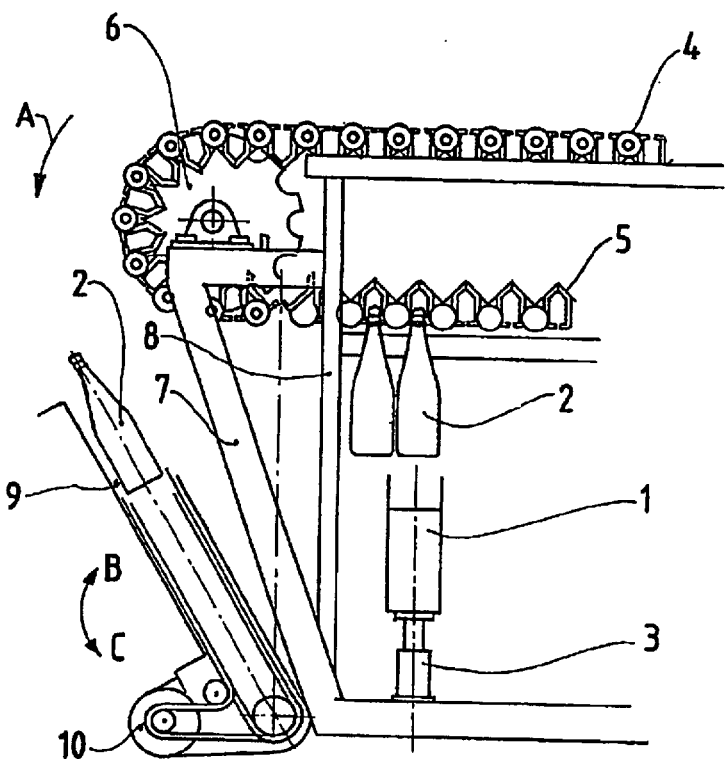
FIG. 1 is a schematic cross-sectional view of the device according to the invention seen from the front, according to a possible state of operation.

The present invention relates, in particular, to a method for decorating objects which can be made e.g. of glass or metal, such as e.g. bottles, which consists in covering, at least partially, said bottles with a coating imitating frost or ice crystals.

Said coating is achieved from a solution of a particular polymer, capable of forming patterns of the desired type during the steps contemplated by said method.

In fact, the latter mainly consists in preparing first said bottles with a view to applying said polymer.

To this end, a previous obscuring of the surface of the bottles is preferably performed, preferably by means of a sand blasting under a pressure between 2 kg/cm$^2$ and 4 kg/cm$^2$, according to the brittleness of the bottles involved.

This first step is particularly important and the care taken in it determines the quality of the final result.

The obscuring will afterwards indeed allow each crystal particle to be attached to the treated surface, in order to cover it with all its brightness.

Accordingly, it has to be carried out in a scrupulous way, with extreme precautions.

The bottles are then cleaned by washing with water, then dried and dusted by blowing, still with care.

In order to optimize the formation of the desired frost crystals, the method also contemplates conditioning the cleaned bottles, for some period of time, so as to bring them in determined physical conditions corresponding to those in which the polymerization reaction is likely to be carried out in the best way.

To this end, before coating the bottles, the latter are left for 24 h in a room in which is maintained a temperature between 4° C. and 6° C.

After this step, the application of a substance capable of polymerizing is proceeded to.

Said application can be performed manually, by means of a brush, for example, within the framework of a craftsman's implementation of the method according to the invention.

It can also be performed mechanically, with adequate means of the device according to the invention, which will be described further in the description.

The present method recommends, furthermore, to use a cyclohexanone solution as a substance capable of polymerizing through drying and of forming patterns imitating ice crystals.

Said cyclohexanone solution will be prepared so as to exhibit physical-chemical characteristics in concordance with the desired final result.

Thus, the viscosity of said solution, for example, will be carefully predefined as a function of the final aspect of the crystals one wishes to achieve.

The viscosity has indeed a direct influence on the color of the latter, which can vary from white to transparent, passing through different nuances of gray.

The higher the viscosity of the cyclohexanone solution, the lesser white said crystals will be.

Once said solution capable of polymerizing has been applied, the polymerization is allowed to be brought about by drying, by placing said bottles in an environment having the required characteristics.

The method according to the present invention contemplates, in particular, placing said bottles for 10 to 60 minutes in an environment of dry air and controlled aeration, at atmospheric pressure and a temperature between 0° C. and 8° C., preferably between 4° C. and 6° C.

According to the values of these various characteristics, a given result will be achieved.

The polymerization is indeed performed while forming crystals during the evaporation of the solvent contained in the cyclohexanone solution.

It is initiated by the movement of air, which must be perfectly controlled.

Preferably, drying should not occur too quickly, otherwise the desired crystal effect could be structureless.

Furthermore, the rate of hygrometry also has an influence on the aspect of the crystals which will, as the case may be, be more brilliant or more mat.

Likewise, beyond a temperature of 8° C., it is impossible to achieve the crystallization of the coating.

Finally, the atmospheric pressure acts on the viscosity of the polymer, hence on the final color of the crystals, as already described above.

Furthermore, the method according to the present invention also contemplates positioning said bottles with respect to each other during drying so as to avoid any interference, especially capable of modifying the air flow acting on the polymerization step.

To this end, said bottles are spaced apart from each other by a determined distance during the step of drying of the coating, which is preferably of at least 5 cm.

In contrast to the various techniques for decorating objects known so far, the coating achieved through the method according to the invention is completely random, like the frost crystals which are spontaneously formed in the nature.

Each coated object will thus have the peculiarity of being unique and completely original.

The present invention also regards a device for implementing said method.

Figure 2:
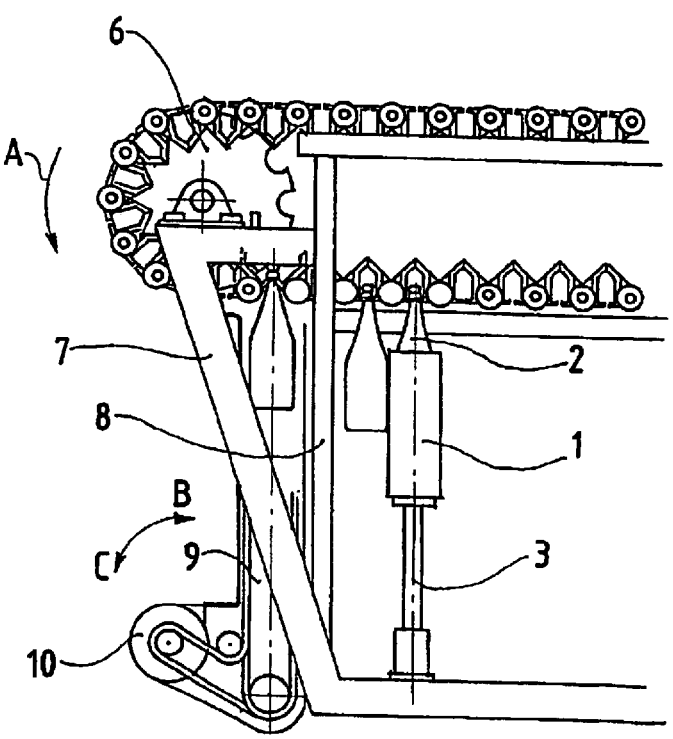
FIG. 2 is another sectional view of the device, the latter being in a different state.
Figure 3:
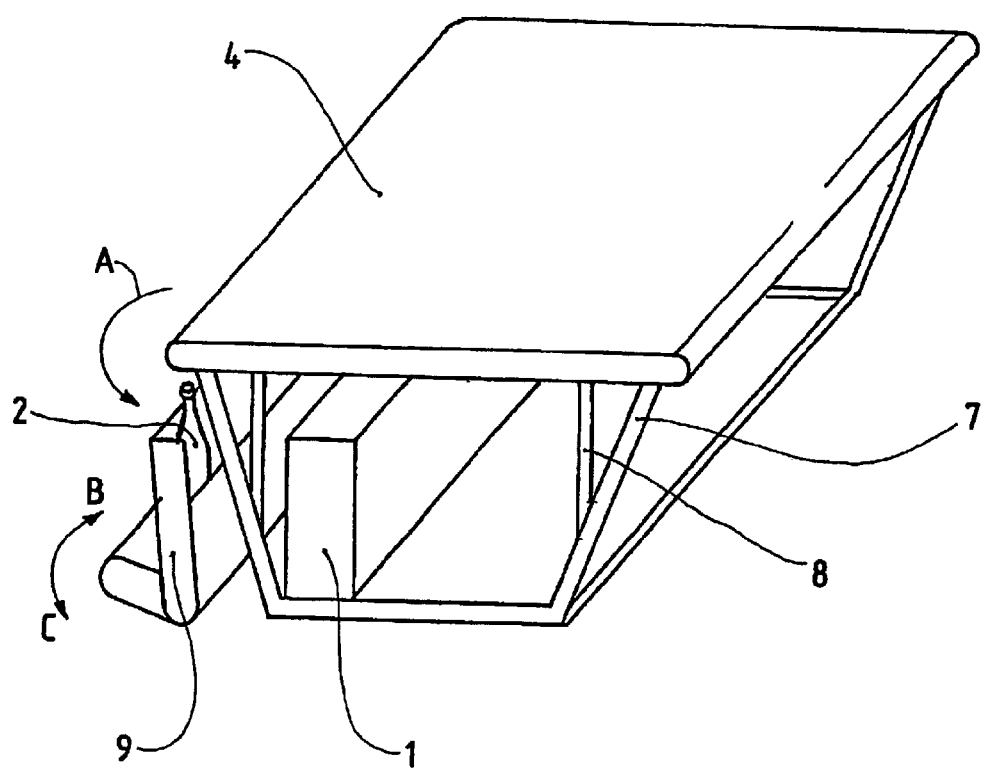
FIG. 3 is a simplified perspective view of the device according to the invention.

Said device will now be described, with reference to FIGS. 1 to 3.

It includes a movable vat 1 containing said substance capable of polymerizing and in which the bottles 2 to be decorated are submerged, rows by rows.

A strut piston 3 allows actuating said vat 1, such as to cause it to move upwards to the bottles 2, in order to coat them, then to move downwards again.

Once cleaned, dried and conditioned at the optimal reaction temperature, said bottles 2 penetrate in rows into the device, thanks to seizing and conveying means which consist of at least one conveyor belt 4 provided with successive rows of clamps 5.

The latter are preferably positioned with respect to each other so as to be distant to each other, once the bottles 3 are attached, preferably by at least about 5 cm.

Said conveyor belt 4 is driven by two parallel chains, each actuated by a set of notched wheels 6, in the direction indicated by arrow A.

When they arrive at the entrance of the device, the bottles 3 are each caught at the level of the neck by one of said clamps 5, in a watertight way, in order to avoid any unwanted penetration of product.

Then, they are conveyed, through the forward movement of the conveyor belt 4, towards the vat 1.

When they arrive above the vat 1, the latter moves upwards, pushed by the strut piston 3, in order to cause them to submerge into the polymerizing substance.

Then the vat 1 moves downward and the continuous movement of the conveyor belt 4 brings along another row of bottles 2.

Said device also comprises means allowing drying the bottles 2 once they have been coated, under optimal conditions of temperature, hygrometry and aeration.

In fact, this is a supporting frame 7 closed by stiles 8 provided with openings positioned and dimensioned so as to allow only a controlled passing through of air and to avoid irregular or brutal flows.

Said openings also allow temperature exchanges between the enclosure of the device and the room in which it is located and in which is, furthermore, maintained an atmospheric pressure and an hygrometry value predetermined as a function of the desired result.

Said bottles 2 are thus put to dry immediately after having been coated, in the very enclosure of the device.

According to a preferred embodiment, said device comprises, in addition, a tipping carriage 9 that allows to automatically supply it with rows of bottles 2.

This carriage 9 brings the bottles 2 to the rows of clamps 5 located at the entrance of said device, by tilting in the direction of arrow B.

The row of bottles 2 is seized by the clamps 5, then leaves the carriage 9 which tilts in the direction of arrow C, to turn back into its initial position and allow the insertion of a new row of bottles 2.

Said carriage 9 comprises, preferably, a belts-and-pulleys system 10 which facilitates the exit of the rows of bottles 2, as well as an easier attaching at the level of the clamps 5.

As clearly results from the preceding description, the present invention provides a very interesting and original solution for the problem of decorating objects made of glass.

It is now indeed perfectly possible to achieve in an automatic way patterns imitating as close as possible the frost crystals observed in nature and this according to a method particularly easy to be implemented, which is not always possible with the prior techniques.

Although the invention has been described in connection with several particular embodiments, it is of course clear that it is not at all limited to same and that various modifications in the form, materials and combinations of these various elements can be made without departing from the scope and the spirit of the invention.

In particular, though it has been described taking glass bottles as an example, the present invention also applies to all other objects, whether simply decorative or for household or alimentary use.

An important market relates namely to the packages for luxury products, such as flasks of perfume, bottles of champagne or other spirits.

I claim:

1. Method for decorating objects comprised of a material such as glass or metal, at least part of a surface of said objects being covered with a coating containing a substance polymerizing while forming patterns, said method comprising the steps of:

drying and dusting said objects by blowing, conditioning said objects so as to place said objects in pre-determined physical conditions for a certain period of time, applying a substance on a surface of each of said objects, said substance capable of polymerizing; and placing said objects in an environment allowing said substance to polymerize by drying while forming desired patterns.

2. Method according to claim 1, further comprising: obscuring of a surface of said objects by sand blasting under a pressure between 2 kg/cm$^2$ and 4 kg/cm$^2$.

3. Method according to claim 1, wherein the physical conditions for said objects are for 24 h at a temperature between 4° C. and 6° C., prior to applying said substance capable of polymerizing.

4. Method according to claim 1, further comprising: applying a cyclohexanone solution with predetermined viscosity according to the desired final aspect of said patterns on said objects.

5. Method according to claim 1, further comprising: drying said objects after applying said substance capable of polymerizing on the surface of said objects for 10 to 60 minutes in an environment of dry air and controlled aeration, under atmospheric pressure and at a temperature between 0° C. and 8° C.

6. Method according to claim 5, wherein said objects are placed at a temperature between 4° C. and 6° C.

7. Method according to claim 1, further comprising: drying said objects, after applying said substance capable of polymerizing, in such a way as to avoid any interference between said objects, while maintaining a space between each of said objects of about at least 5 cm.

8. Device for implementing the process according to claim 1 comprises:

a movable vat for applying said substance capable of polymerizing on said objects;

means for seizing and conveying said objects, row by row, to said vat, and means for drying said objects under given conditions of temperature, hygrometry and aeration.

9. Device according to claim 8, wherein said vat is actuatable by a strut piston causing movement thereof upwards for coating each row of objects, then movement downwards again.

10. Device according to claim 8, wherein said seizing and conveying means are comprised of at least one conveyor belt provided with rows of clamps which can open and close, said conveyor belt being driven by two parallel chains, each actuated by a set of notched wheels.

11. Device according to claim 10, wherein the clamps are positioned with respect to each other on each one of the rows at such a distance that the objects, once attached, are spaced about 5 cm from each other.

12. Device according to claim 8, further comprising: a supporting frame closed by stiles provided with openings for a controlled passing through of air and the conditioning of said objects for drying.

13. Device according to claim 8, further comprising: a tipping carriage conveying said objects, row by row, to said seizing and conveying means.

14. Device according to claim 13, wherein said tipping carriage further comprises a belt-and-pulley system facilitating an exit of said rows of objects.

* * * * *